United States Patent [19]

Ozawa

[11] Patent Number: 5,890,696
[45] Date of Patent: Apr. 6, 1999

[54] ADJUSTER

[75] Inventor: Junichi Ozawa, Ebina, Japan

[73] Assignee: Fuji Xerox Co., Ltd., Tokyo, Japan

[21] Appl. No.: 834,459

[22] Filed: Apr. 16, 1997

[30] Foreign Application Priority Data

Apr. 19, 1996 [JP] Japan .................................. 8-098573

[51] Int. Cl.$^6$ ...................................................... F16M 1/00
[52] U.S. Cl. ...................... 248/677; 248/688; 248/188.8; 248/188.4
[58] Field of Search ...................................... 248/677, 638, 248/687, 680, 206.5, 309.4, 688, 188.4, 188.8, 501, 502, 188.2

[56] References Cited

U.S. PATENT DOCUMENTS

| | | | |
|---|---|---|---|
| 4,953,714 | 9/1990 | Paul | 211/36 |
| 4,991,805 | 2/1991 | Solak et al. | 248/188.4 |
| 5,203,039 | 4/1993 | Fredman | 5/203 |
| 5,231,713 | 8/1993 | Mcdonnell | 5/310 |
| 5,314,625 | 5/1994 | Farnelli | 210/695 |
| 5,465,078 | 11/1995 | Jones, Jr. | 335/305 |
| 5,634,755 | 6/1997 | Jones, Jr. | 411/383 |

OTHER PUBLICATIONS

Service Manual "A Color 930/935".
Service Manual "Docu Color 4040".

*Primary Examiner*—Leslie A. Braun
*Assistant Examiner*—Kimberly Wood
*Attorney, Agent, or Firm*—Oliff & Berridge, PLC

[57] ABSTRACT

An adjuster 10 includes a magnet block 20 which is able to turn on and off the magnetic force with a switch 21. A leg 40 is coupled through a bracket 30 to the magnet block 20 with a screw 41. With the attractive surface 22 of the magnet block 20 in close contact with the bottom surface 4a of the base 4 of a copying machine 1, the switch 21 is turned on to magnetically attach the magnet block 10 to the bottom surface 4a of the base 4 of the copying machine 1. A flange 42 is turned to move the leg 40 towards the floor F with the aid of the screw 41 until a pad 43, which is the bottom of the leg 40, is brought into contact with the floor F, thereby to eliminate the vibration of the copying machine. The magnetic force of the magnet block 20 is turned on and off merely by operating the switch 21, so that the adjuster is attached to or removed from the copying machine with ease. When it is required to move the copying machine, the adjuster is removed therefrom. That is, it is unnecessary to equip each of the installed structures with the adjuster; only the user who needs the adjuster should obtain it, which results in a great reduction in cost.

4 Claims, 4 Drawing Sheets

ADJUSTER

BACKGROUND OF THE INVENTION

1. Field of the Invention

This invention relates to an adjuster which is used to eliminate the vibration of a structure (such as a copying machine, a refrigerator and a desk) which is installed on the floor, thereby to allow the person to use the structure steadily.

2. Description of the Related Art

In general, in a copying machine installed on the floor of an office or the like, its cabinet is supported with casters at the four corners so that it can be readily moved. In the case where the floor on which the copying machine is to be installed is flat, the four caster are all set on the floor; that is, the copying machine is held stable. However, if the floor is not flat or curved, one of the casters rises above the floor, so that the cabinet is liable to vibrate. If the cabinet vibrates, then not only it is impossible to stably use the copying machine, but also the vibration adversely affects the precise mechanism of the copying machine. Hence, in general, an adjuster is employed to eliminate the vibration of the copying machine.

In FIG. 7, reference numeral 50 designates a conventional adjuster. FIG. 8 shows the arrangement of four casters 3 and two adjusters 50 on the cabinet 2 of a copying machine 1. Each of the adjusters 50 comprises: a bolt 53 including a head 51 and a threaded portion 52; and a rotary plate 54 which is coupled to the head 51 of the bolt 53 in such a manner that it is rotatable with respect to the bolt 53. The threaded portion 51 of the bolt 53 is screwed into a threaded hole 4b formed in the base 4 which is the bottom of the cabinet 2. The threaded holes 4b are provided at both ends of the base 4 on the side of operation of the cabinet 2 (on the forward side, or the lower side in FIG. 8). Usually, first the bolt 53 is screwed into the threaded hole 4b to the extent that the rotary plate 54 is somewhat spaced away from the floor F. And in the case where the cabinet 2 is vibrated, the adjuster 50 on the side of vibration is protruded towards the floor F by turning the bolt 53 with a tool such as a spanner until the rotary plate 54 touches the floor F. Instead of the threaded hole 4b, a nut may be employed which is secured to the base 4.

When all installation places or all floor conditions are taken into consideration, each copying machine must have two adjusters. However, in practice, installing places which require the adjusters 50 are very few. Hence, in most cases, it is not useful to equip the cabinet with the adjusters. In addition, the provision of the adjusters results in an increase in manufacturing cost of the copying machine. Furthermore, it is necessary for the copying machine to have a tool to turn the bolt 53. To turn the bolts 53 takes time and labor. To equip the copying machine with the tool results in an increase in manufacturing cost of the copying machine as much.

When it is required to move the copying machine, the copying machine is moved by means of the casters 3 with the adjusters 50 raised above the floor F. If the floor F has a step, in order to move the copying machine over the step the adjusters must be sufficiently raised above. This is rather troublesome. If the step is large, then the adjuster or adjusters 50 may be damaged being struck against the step.

SUMMARY OF THE INVENTION

In view of the foregoing, an object of the invention is to provide an adjuster which can be operated with ease, and it allows a person or persons to move a heavy structure (such as a copying machine, and a refrigerator) smoothly, and which is manufactured at low cost.

The foregoing object of the invention is achieved by the provision of an adjuster for eliminating the vibration of a structure which is installed on a substantially horizontal installing plane such as a floor; which, according to the invention, comprises:

a mounting surface of the structure;

an adjuster body having an attractive surface which is brought into contact with the mounting surface; and a leg which is attached to the adjuster body in such a manner that the leg is freely moved to and from the installing plane, and which is brought into contact with the installing plane as the leg is moved towards the installing plane;

wherein one selected from the. group consisting of the mounting surface and the attractive surface being made of a magnetic substance, while the other having means for turning on and off a magnetic force.

The adjuster of the invention functions as follows:

In the case where a structure such as a copying machine installed on a installing plane such as a floor vibrates, the attractive surface of the adjuster body is brought into close contact with the mounting surface, on the side of the vibration, of the installed structure, and under this condition, the magnetic force of the magnet is turned on by operating the on/off switching means, so that the adjuster body is magnetically secured to the mounting surface. There-after, the leg is moved towards the installing plane until it is brought into contact with the latter, thus eliminating the vibration of the cabinet.

The adjuster can be attached to or removed from the installed structure with ease merely by operating the switching means on and off which is adapted to turn on and off the magnetic force of the magnet. In the case where it is required to move the installed structure, the adjuster can be removed therefrom. Hence, the difficulty is eliminated that the adjuster becomes an obstruction against the movement of the installed structure. In the case where the adjuster body includes the magnet, the adjuster should be used only when the installed structure vibrates. Hence, it is unnecessary to equip each of the installed structures with the adjuster, which results in a great reduction in cost.

BRIEF DESCRIPTION OF THE DRAWING(S)

FIG. 1 a front view of a copying machine equipped with an example of an adjuster, which constitutes an embodiment of the invention.

DETAILED DESCRIPTION OF THE PREFERRED EMBODIMENTS

One preferred embodiment of the invention will be described with reference to the accompanying drawings.

Figure 1:
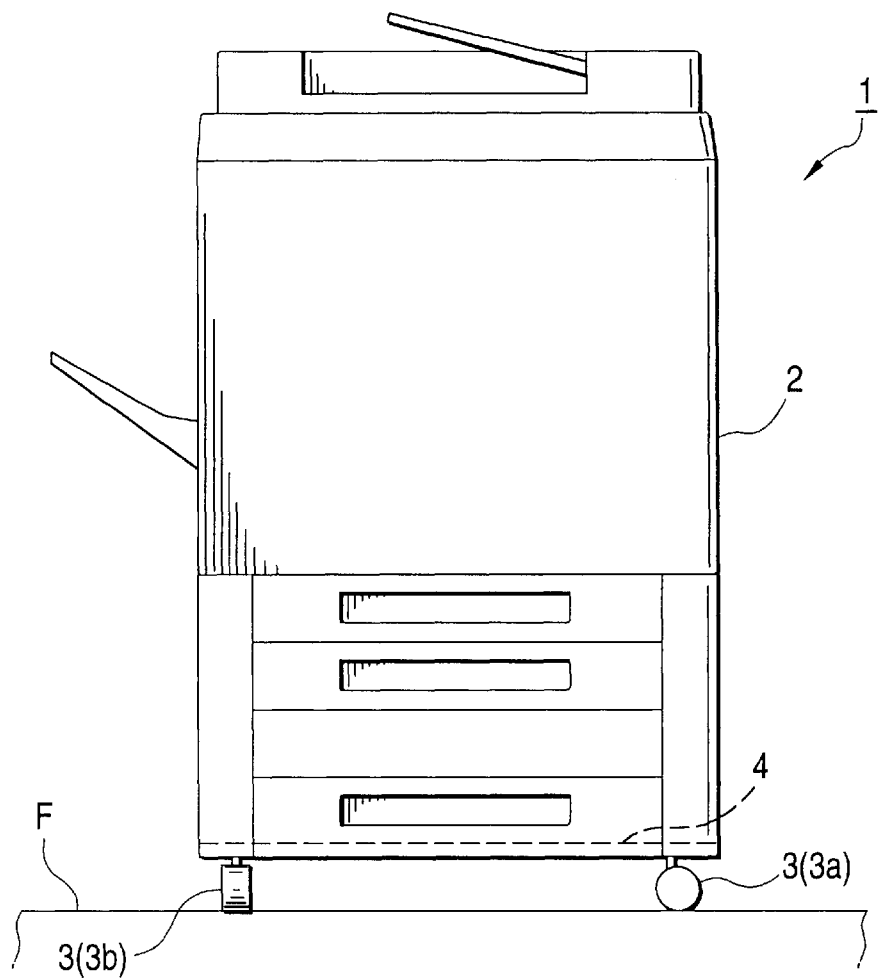
Figure 2:
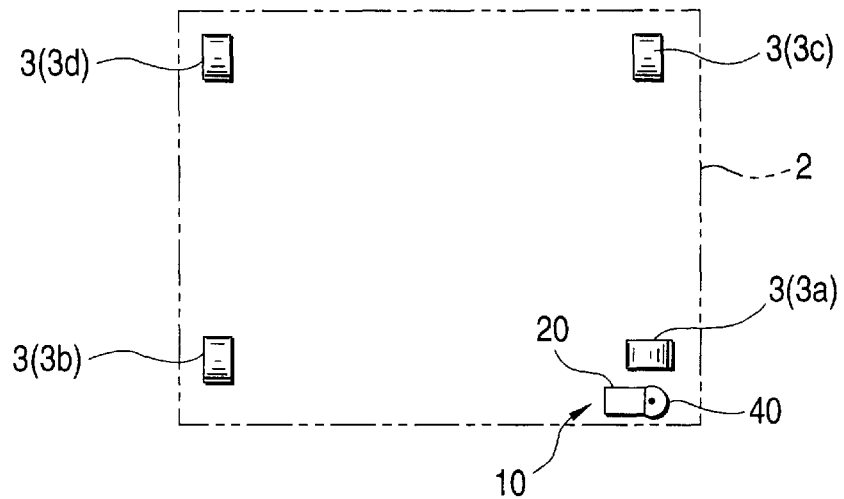
FIG. 2 is a bottom view of the copying machine shown in FIG. 1.

FIG. 1 shows a copying machine 1 which is a structure equipped with an adjuster 10 according to the invention. The copying machine 1 comprises: a cabinet 2 which is in the form of a vertically-elongated-rectangular-box; and an image forming device (not shown) set in the cabinet 2. The copying machine 1 is installed on a horizontal floor (or installing surface) F. As shown in FIG. 2, the cabinet 2 has four casters 3 (3a, 3b, 3c and 3d) respectively at the four corners of the bottom, which support the cabinet 2 on the floor F, and are used to readily move the copying machine. In FIG. 1, the front side, or in FIG. 2, the lower side, is the operating side of the copying machine.

As shown in FIG. 1, the bottom of the cabinet 2 is a base 4 which is a magnetic member such as an iron plate. The bottom surface (or mounting surface) 4a of the base 4 is flat, and is in parallel with the floor F. A gap is formed between the bottom surface 4a of the base 4 and the floor F in accordance with the height of the casters 3. The aforementioned adjuster 10 is provided between the cabinet 2 and the floor F. More specifically, in the case where the floor F is uneven or warps; that is, the cabinet 2 is liable to vibrate on the floor F, the adjuster 10 is mounted on the base 4.

Figure 3:
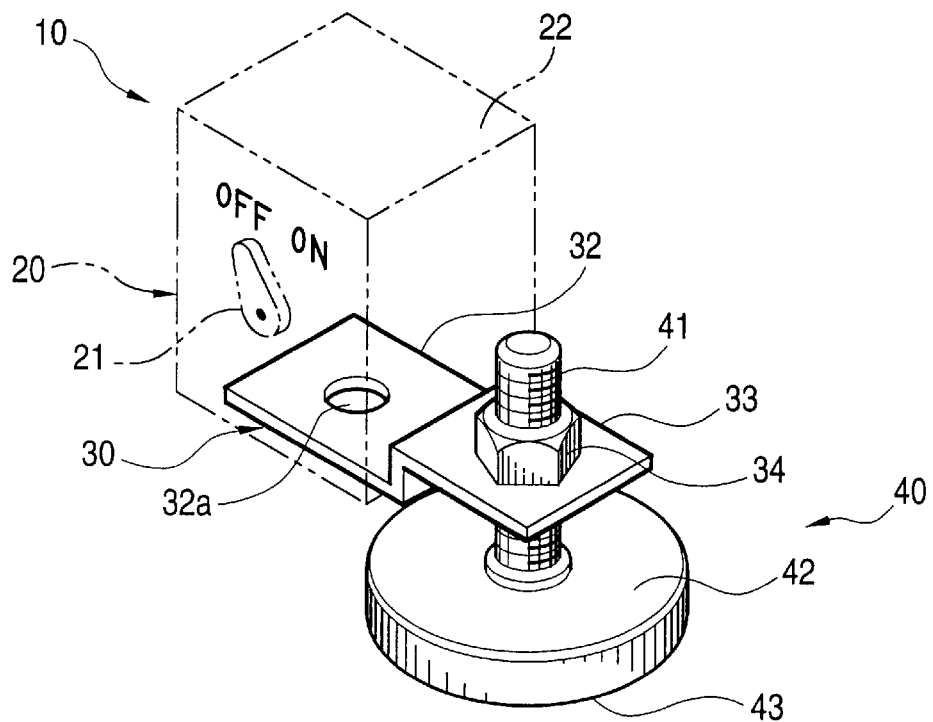
FIG. 3 is a perspective view of the adjuster according to the invention.
Figure 4:
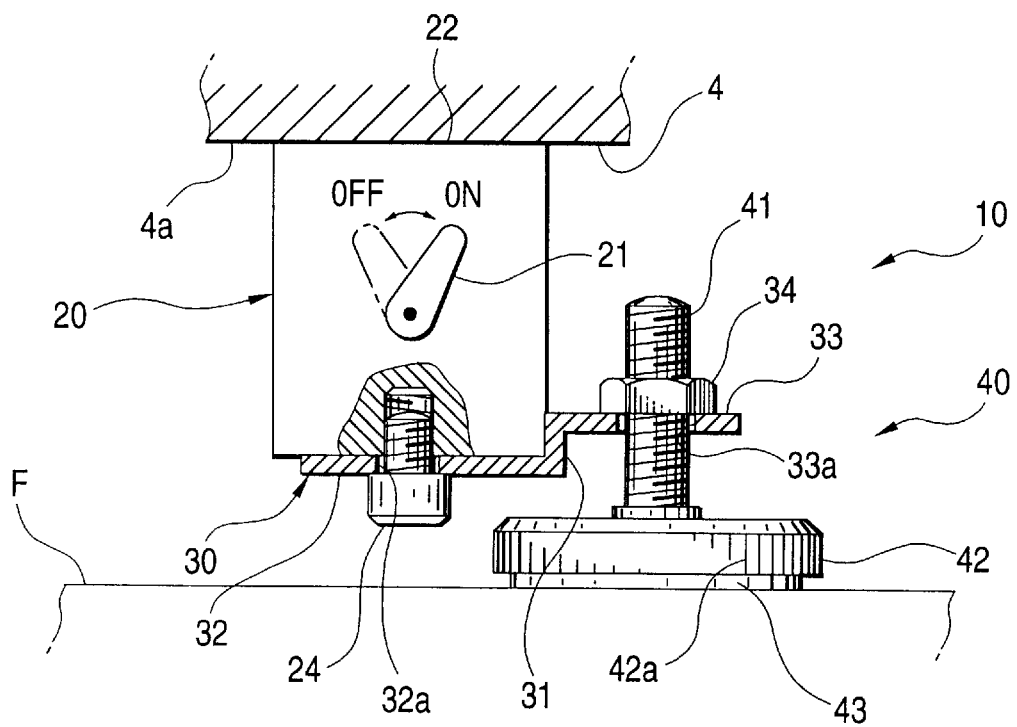
FIG. 4 is a side view, with parts cut away, showing the adjuster according the invention.

The adjuster 10, as shown in FIGS. 3 and 4, comprises a magnet block (or adjustor body) 20, and a leg 40 coupled through a bracket 30 to the magnet block 20.

The magnet block 20 is in the form of a rectangular box, and accommodates a magnet (not shown) inside it. The magnet block 20 is so designed that the magnetic force of the magnet is mechanically switched on and off with a toggle type switch 21. When the switch 21 is turned on, a magnetic force is produced on an attractive surface 22 which is the top surface of the magnet block 20, so that the attractive surface 22 is magnetically fixed to the magnetic member. When the switch 21 is turned off, the magnetic force of the attractive surface 22 disappears, so that the attractive surface 22 is removed from the magnet member (or base). As shown in FIG. 4, the magnet block is magnetically secured to the bottom surface 4a of the base 4 with the attractive surface 22 at the top. A threaded hole 23 is formed in the bottom surface of the magnet block 20. The aforementioned bracket 30 is secured to the magnet block 20 with a screw 24 engaged with the threaded hole 23. The bracket 30 is a rectangular plate which has a step 31 at the middle. That is, the bracket includes two portions on both side of the step. One of the two portions of the bracket is different in length from the other portion. Hereinafter, the one portion of the bracket 30 will be referred to as a long plate portion 32, while the other portion will be referred to as a short plate portion 33. A through-hole 32a is formed in the long plate portion 32 at the center, and similarly a through-hole 33a is formed in the short plate portion 33 at the center.

The bracket 30 is secured to the magnet block 20 as follows: With the step 31 abutted against one side surface of the magnet block 20, and with the long plate portion 32 of the bracket 30 abutted against the bottom of the magnet block 20, a screw 24 is inserted into a through-hole 32a and then engaged with a threaded hole 23 formed in the bottom of the magnet block. Thus, the bracket 30 has been secured to the magnet block. A nut 34 is welded to the upper surface of the short plate portion 33 of the bracket 30 in such a manner that it is coaxial with the through-hole 33a.

The aforementioned leg 40 includes a screw 41, a flange (or operating piece) secured to the lower end of the screw 41, and a pad (or pressuring receiving portion) 43 fixed to the bottom of the flange 42.

The screw 41 is inserted into the through-hole 33a of the bracket 30 and engaged with the nut 34. Under this condition, the direction of axis of the screw 41 is perpendicular to the attractive surface 22 of the magnet block 20. The flange 42 is in the form of a disk, and has a recess (not shown) in the bottom. The upper surface of the flange 42 is welded to the lower end of the screw 41 in such a manner that the flange 42 is coaxial with the screw 41; that is, the flange 42 and the screw 41 are turned as one unit. The diameter of the flange 42 is about four or five times as large as the diameter of the screw 41. A number of grooves are formed in the cylindrical surface of the flange 42; that is, the cylindrical surface of the flange 42 is knurled as indicated at 42a. The pad 43 is in the form of a disk, and made of a hard rubber or the like which is elastic to some extent, and it is fitted in the recess formed in the bottom of the flange 42 in such a manner that it is coaxial with the flange 42. Under this condition, the bottom portion of the pad 43 is protruded downwardly from the bottom of the flange 42, and is in contact with the floor F.

The flange is turned with the knurled cylindrical surface held with fingers or by rubbing the knurled cylindrical surface with the fingers, so that the screw 41 of the aforementioned leg 40 is screwed into or unscrewed from the nut 34, whereby the leg 40 is raised or lowered with respect to the magnet block 23. The leg 40 can be raised until the flange 42 abuts against the long plate portion 32 of the brake 31.

Now, a method of using the above-described adjuster 10 will be described.

If, when the copying machine is installed on the floor F, the latter F is uneven or warps, the cabinet 2 is liable to vibrate. This vibration is due to the fact that the two casters 3 on one of the two diagonal lines of the rectangular bottom are stable on the floor, but the remaining two casters 3 of the remaining diagonal line are unstable vibrating up and down. That is, the cabinet is vibrated on the floor with the two casters as fulcrums. It is assumed that, in FIG. 2, the cabinet is vibrated because the casters 3a and 3d are unstably in contact with the floor. In this case, between those casters 3a and 3d, the front one 3a is selected so that the adjuster 10 is provided on the bottom 4a of the base 4 in front of the caster 3a. In this operation, first the magnetic force of the magnet block 20 is turned off with the switch 21, and then the flange 42 is turned so that the leg 40 is fully raised (retracted) towards the magnet block 20.

Next, the attractive surface 22 of the magnet block 20 is brought into contact with the bottom surface 4a of the base 4 in front of the caster 3 which is on the side of vibration of the cabinet 2, in such a manner that the leg 40 is not extended outside the cabinet when viewed from top. Under this condition, the switch 21 is turned on to cause the magnet block 20 to produce the magnetic force. As a result, the magnet block 20 is magnetically secured to the base 4. The leg 40 may be freely moved to and from the floor F, while the pad 43 is rotatable in a plane which is substantially in parallel with the floor F. Thereafter, the cabinet 2 is pushed backwardly so that the rear caster 3d is brought into contact with the floor F while the front caster 3a is spaced away from the floor F. Under this condition, the flange 42 is turned to unscrew the screw 41 from the nut 34 so that the leg 40 is moved downwardly (or towards to the floor F) until the pad 43 is brought into contact with the floor F. The flange 42 is turned to the extent that a certain load is applied to the pad 43; that is, the amount of extension of the leg 40 is finely adjusted. The pad 43, being in contact with the floor F, is no longer rotatable; however, the flange 42 and the screw 41 are rotatable with respect to the pad 43. Hence, the flange 42 can be turned independently of the pad 43. Thus, the cabinet 2 has been supported on the floor F by the three casters 3b, 3c and 3d and the adjuster 10, being prevented from being vibrated. The pad 43 is in the form of a disk, and receives the load on its surface, and it is made of a hard rubber which is elastic to some extent. Therefore, the pad will not damage the floor.

Now, let us consider the case where the copying machine 1 is moved to somewhere. In this case, first the flange 42 is turned to screw the screw 41 into the nut 33 to raise the leg 40 somewhat, thereby to allow the cabinet to vibrate again. Under this condition, the cabinet 2 is pushed backwardly, to form a gap between the pad 43 and the floor F, and the magnet block 20 is held with the finger while the switch 21 is turned off. As a result, the magnetic force of the magnet block 20 disappears; that is, it is no longer stuck onto the base 4. Hence, the adjuster 10 can be removed from the cabinet. After the adjuster 10 being removed from the cabinet, the copying machine 1 is moved with the aid of the casters 3 to a new position, where it is installed. If at the new position the copying machine 1 vibrates, then the adjuster 10 is secured to the cabinet in the same way. When, at the new position, the copying machine 1 is not vibrated at all, of course it is unnecessary to attach the adjuster 10 to the cabinet.

In the above-described embodiment, the magnetic force of the magnet block 20 is turned on and off by the operation of the switch 21; that is, the magnet block 20 can be secured to or removed from the cabinet in one action; in other words, it can be secured to or removed from the cabinet 2 with ease.

Only in the case where the condition of the floor F causes the copying machine to vibrate, the user needs to obtain (purchase) the adjuster. That is, it is unnecessary to equip each of the copying machines with the adjuster. In other words, the invention eliminates a waste that all the copying machines have their own adjusters. Today, in general, the copying machine installation condition which requires the use of the adjuster is rare, and therefore it is unnecessary to manufacture a number of adjusters 10. On the other hand, the operation of the adjuster 10 can be achieved merely by turning the flange 42 with the fingers. The diameter of the flange 42 is large to the extent that the flange 42 can be readily turned with the fingers. Hence, no tool is required for the rotation of the flange 42. Those features contribute to a great reduction in manufacturing cost of the copying machine.

When it is required to move the copying machine 1, the adjuster 10 can be removed from the cabinet 2 as was described above. Hence, the copying machine of the invention is free from difficulty that, in the case where the floor F includes a step, the adjuster 10 makes it difficult for the copying machine to move over the step or the adjuster is damaged when the copying machine is moved over the step. This is because the adjuster 10 can be magnetically secured to or removed from the cabinet readily merely by operating the switch.

As was described above, the adjuster 10 can be readily attached to or removed from the cabinet. Hence, the adjuster 10 can be attached to any part of the cabinet to eliminate the vibration of the latter. That is, only one adjuster 10 can prevent the vibrations of the cabinet in all directions independently of the location and the degree of vibration.

Furthermore, the leg 40 is coupled to the magnet block 5 through the bracket 30 which is laterally extended, which reduces the height of the adjuster 10 as much. This feature makes it simple to set the adjuster 10 between the cabinet 2 and the floor F. Moreover, the leg 40 is moved to and from the floor with the aid of the screw 41. Therefore, the adjuster is low in component cost, and can be assembled with ease.

While there has been described in connection with the preferred embodiment of the invention, it will be obvious to those skilled in the art that various changes and modifications may be made therein without departing from the invention. A few modifications thereof will be described.

Figure 5:
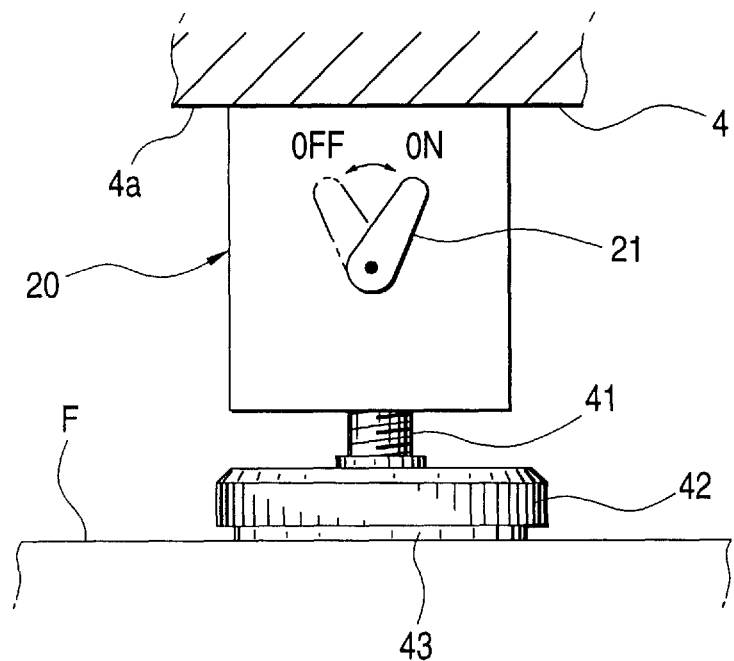
FIG. 5 is a view showing one modification of the adjuster according to the invention.
Figure 6:
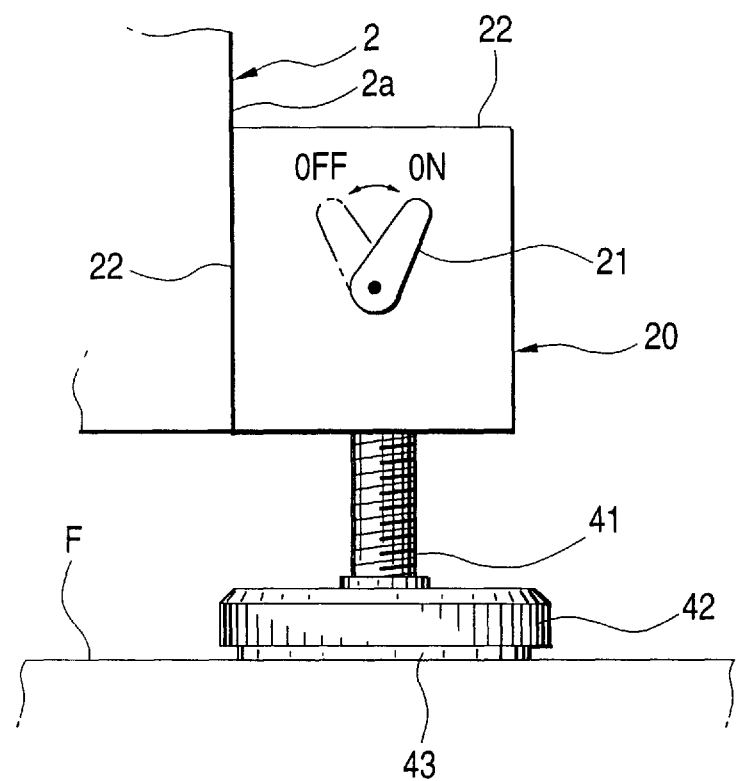
FIG. 6 is a side view showing another modification of the adjuster according to the invention.
Figure 7:
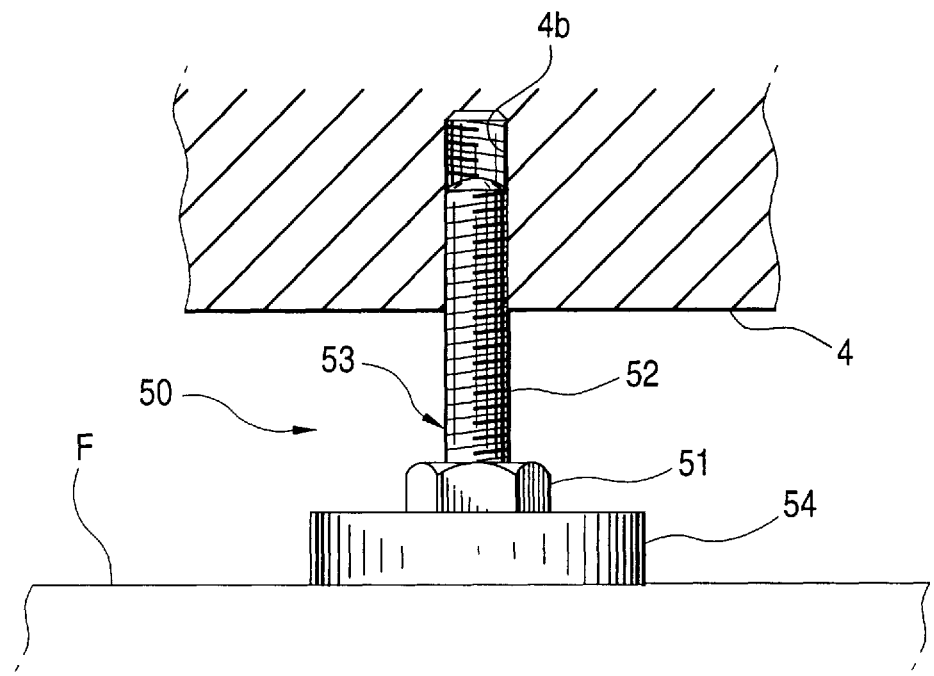
FIG. 7 is a side view showing a conventional adjuster attached to a copying machine.
Figure 8:
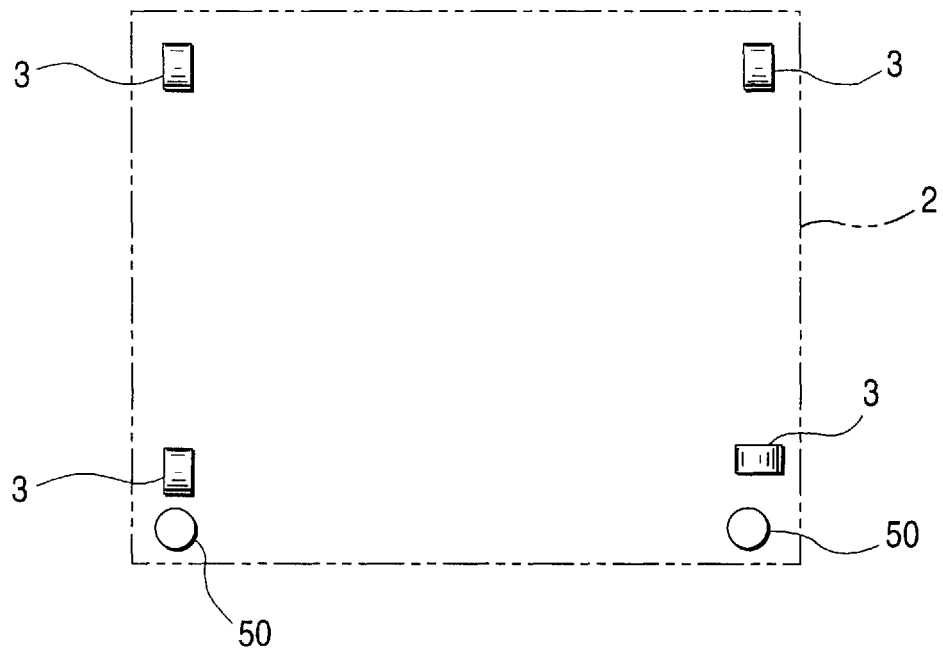
FIG. 8 is a plan view showing the arrangement of the conventional adjusters on the copying machine.

(1) In the above-described embodiment, the leg 40 is coupled to the magnet block through the bracket 30. However, the adjuster may be modified as shown in FIG. 5. That is, in the modification, the screw 41 is directly screwed into the magnet block 20. In addition, in the above-described embodiment, only the upper surface of the magnet block 20 is the attractive surface 22; however, the magnet block may be so modified that its side surface is also an attractive surface. In this case, as shown in FIG. 6, the magnet block may be attached to the lower portion of the side surface of the cabinet 2. In this case, the side surface of the cabinet must be of magnetic substance. The modification is effective in the case where the distance between the cabinet 2 and the floor F is short.

(2) In the above-described embodiment, the flange 42 of the leg 40 is attached to the lower end of the screw 41; however, it may be attached to the middle of the screw 41. In this case, the pad 43 must be attached to the lower end of the screw 41 in such a manner that it is rotatable with respect to the screw.

(3) The leg 40 should have at least the screw 41 and the flange 42. Hence, depending on the condition of the floor F (for instance in the case where the floor F is covered with a carpet), the adjuster need not have the pad 43.

(4) In the above-described embodiment, the leg 40 is moved to and from the floor F by means of the screw 41; however, the invention is not limited thereto or thereby. That is, instead of the screw 41, any means which allows the leg 40 to move to and from the floor F may be employed.

(5) The magnet in the magnet block may be an electromagnet whose magnetic force can be turned on and off.

(6) Furthermore, the magnet block 20 may be replaced with a block which is made of a magnetic substance, having no magnet. In this case, the base 4 is made up of a magnet whose magnetic force can be turned on and off.

(7) The structure to which the adjuster 10 is applied is not limited to the copying machine only. That is, the adjuster 10 may be applied any structure such as a refrigerator, a disk and furniture which is set on an installing surface such as a floor.

As was described above, the adjuster according to the invention can be readily attached to or removed from a structure such as a copying machine merely by turning on and off the magnetic means. When it is required to move an installed structure, the adjuster can be readily removed therefrom. Hence, the difficulty is eliminated that the adjuster becomes an obstruction against the movement of the installed structure vibrates. In the case where the adjuster body includes the magnet, the adjuster should be used only when the installed structure vibrates. Hence, it is unnecessary to equip each of the installed structures with the adjuster, which results in a great reduction in cost.

What is claimed is:

1. A structure and an adjuster for eliminating vibration of said structure wherein said adjuster is installed on a substantially horizontal installing plane, said adjuster comprising:

an adjuster body having an attractive surface which is brought into contact with a mounting surface of said structure; and a leg which is attached said adjuster body in such a manner that said leg is freely moved to and from said installing plane, and which is capable of being brought into contact with said installing plane and said leg is moved towards said installing plane;

wherein one of said mounting surface and said attractive surface is made of a magnetic substance, and said attractive surface has means for turning on and off a magnetic force.

2. An adjuster as claimed in claim 1, wherein said leg comprises:

a screw threadably engaged with said adjuster body;

an operating piece integral with said screw; and a disk-shaped pressure receiving portion which is coupled to the end, on the side of said installing plane, of said operating piece in such a manner that said pressure receiving portion is rotatable with respect to said operating piece in a plane which is substantially in parallel with said installing plane, and said pressure receiving portion is brought into contact with said installing surface as said screw is moved towards said installing surface.

3. An adjuster as claimed in claim 2, wherein said operating piece is a disk-shaped member which is larger in diameter than said screw, and is coaxially secured to said screw.

4. An adjuster as claimed in claim 2, wherein said pressure receiving portion is made of an elastic material.

* * * * *